US008787735B2

United States Patent
Ueno

(10) Patent No.: US 8,787,735 B2
(45) Date of Patent: Jul. 22, 2014

(54) REPRODUCTION APPARATUS AND CONTROL METHOD THEREOF

(75) Inventor: Shogo Ueno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/547,265

(22) Filed: Jul. 12, 2012

(65) Prior Publication Data

US 2013/0034342 A1 Feb. 7, 2013

(30) Foreign Application Priority Data

Aug. 4, 2011 (JP) ................................ 2011-171321

(51) Int. Cl.
  *H04N 5/76* (2006.01)
  *H04N 9/80* (2006.01)
  *H04N 5/93* (2006.01)

(52) U.S. Cl.
  USPC ............ 386/295; 386/248; 386/291; 386/353

(58) Field of Classification Search
  None
  See application file for complete search history.

(56) References Cited

U.S. PATENT DOCUMENTS

| 7,466,898 B2 * | 12/2008 | Ohashi .................... 386/241 |
| 2007/0092220 A1 | 4/2007 | Tanabe |
| 2009/0097820 A1 | 4/2009 | Furuyama |

FOREIGN PATENT DOCUMENTS

| JP | 2001-210017 | 8/2001 |
| JP | 2002-112201 | 4/2002 |

OTHER PUBLICATIONS

Oct. 11, 2013 US Office Action that issued in related U.S. Appl. No. 13/547,281, which is enclosed.
May 14, 2014 U.S. Final Office Action, that issued in related U.S. Appl. No. 13/547,281.

* cited by examiner

*Primary Examiner* — Heather Jones
(74) *Attorney, Agent, or Firm* — Cowan, Liebowitz & Latman, P.C.

(57) ABSTRACT

A reproduction apparatus comprises a reproduction unit configured to reproduce image data from a recording medium; a recognition unit configured to recognize users in response to reproduction of selected image data; and a control unit configured to inhibit deletion of the selected image data from the recording medium, in a case where there is a user, other than users recognized by the recognition unit, who has not reproduced the selected image data among a plurality of predetermined users.

12 Claims, 9 Drawing Sheets

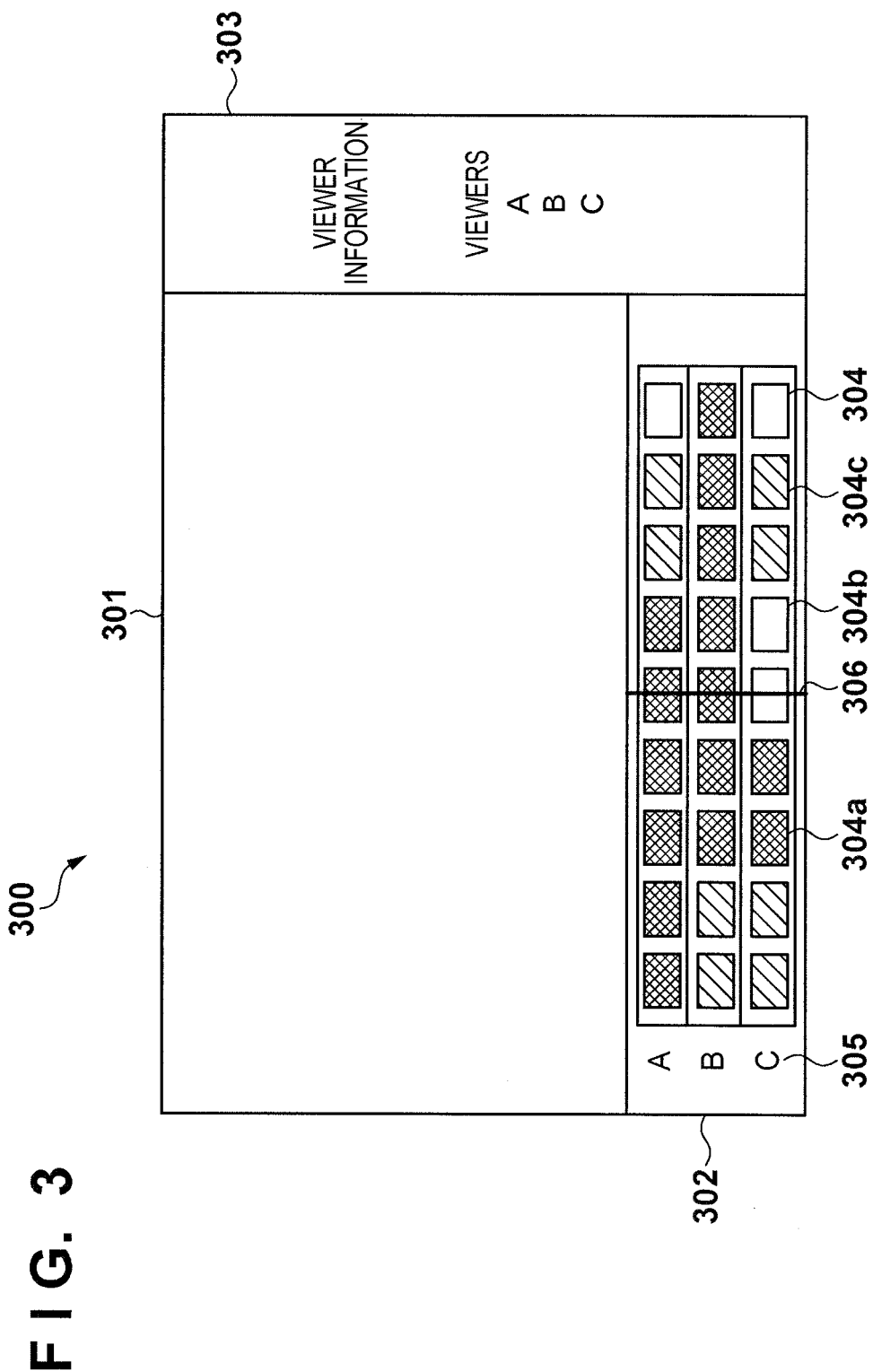

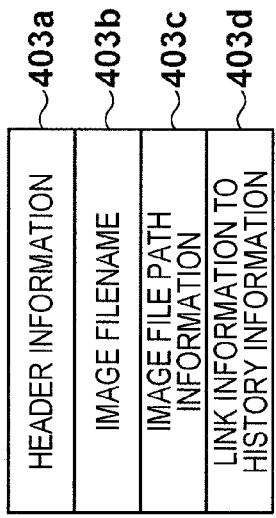
FIG. 4A
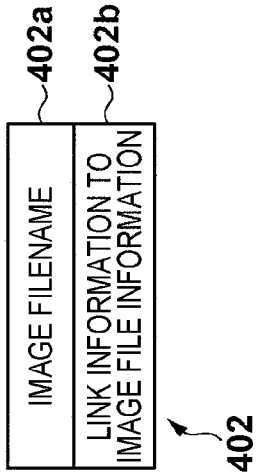
FIG. 4B
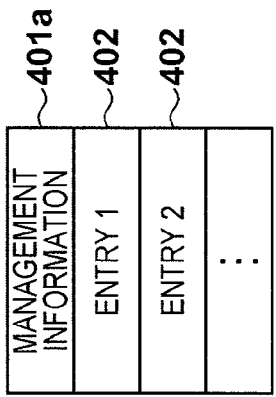
FIG. 4C
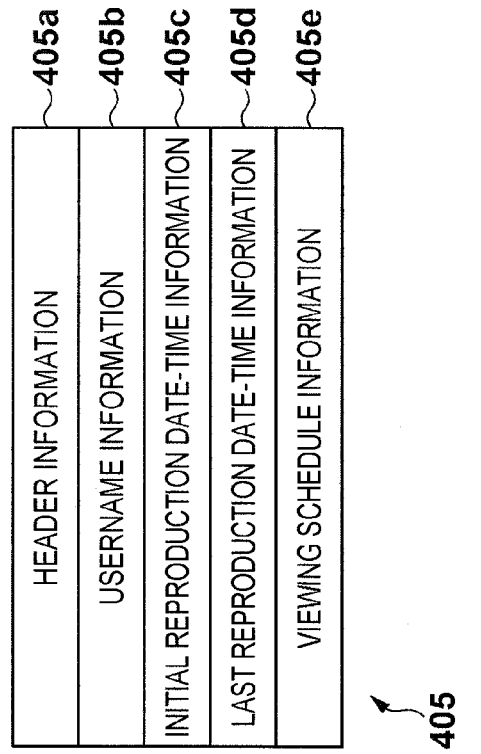
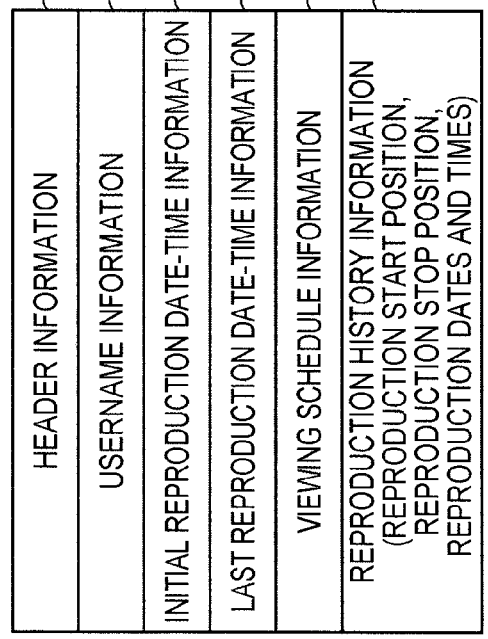
FIG. 4D

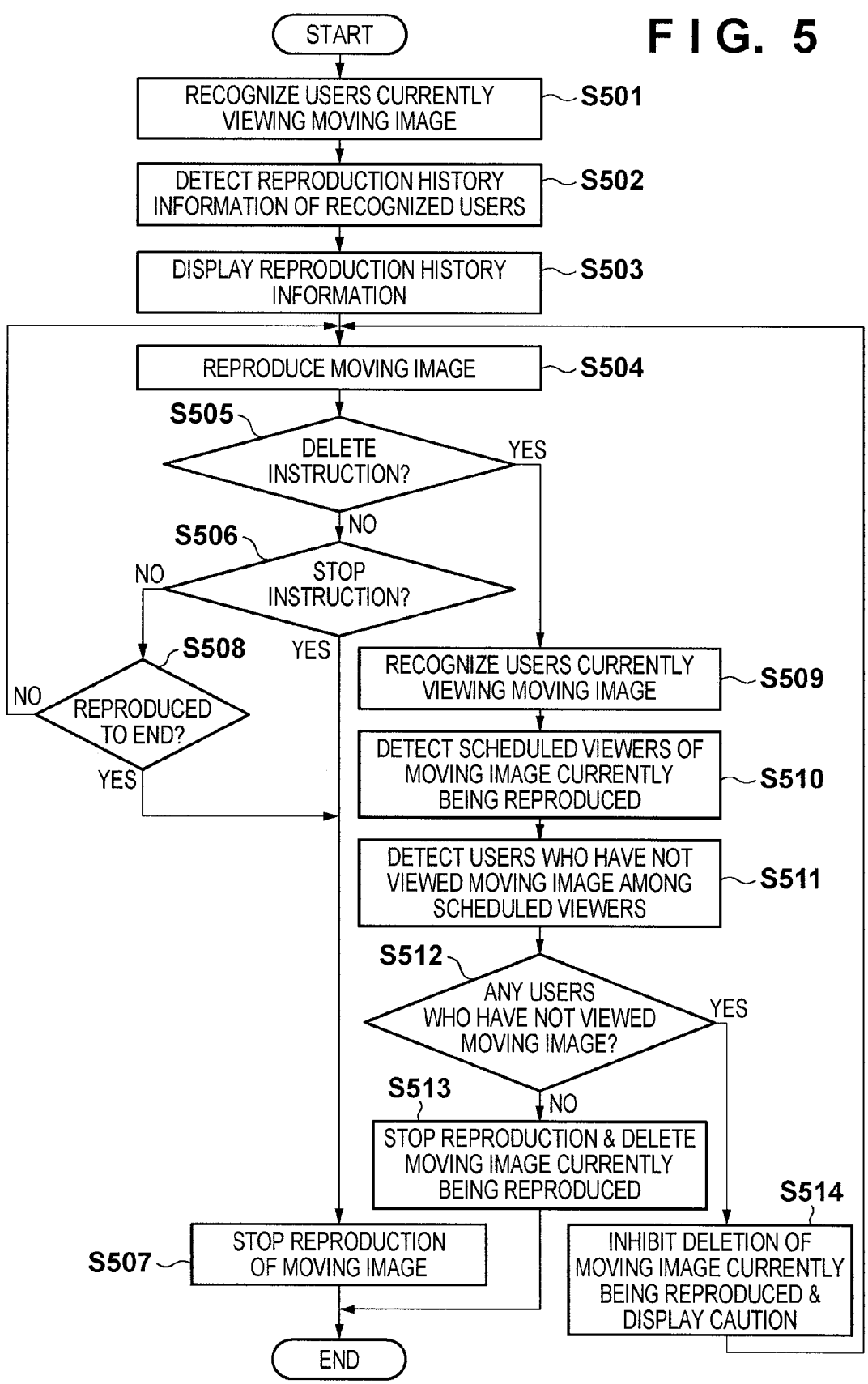

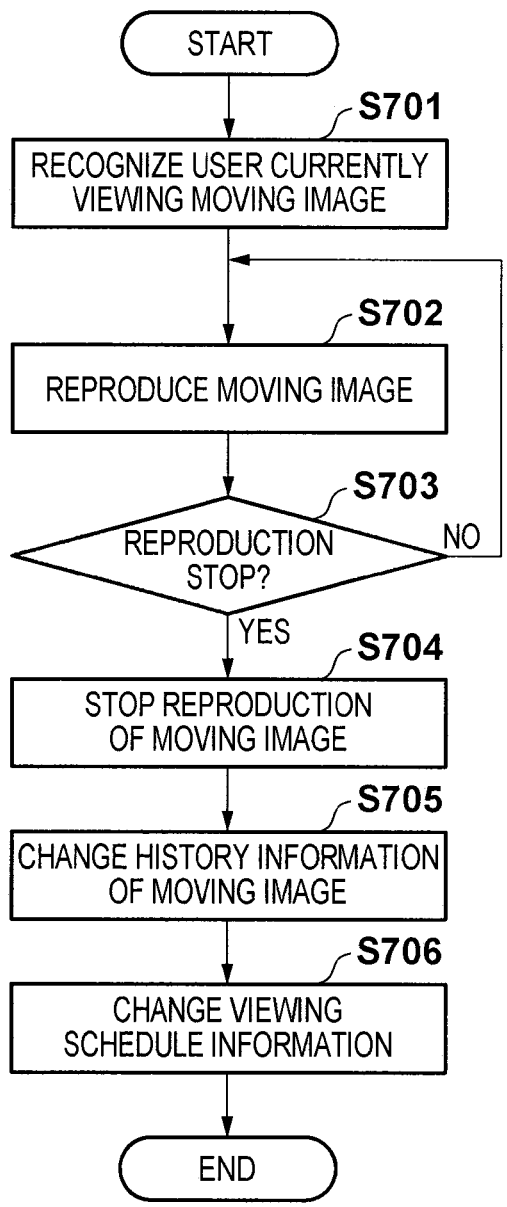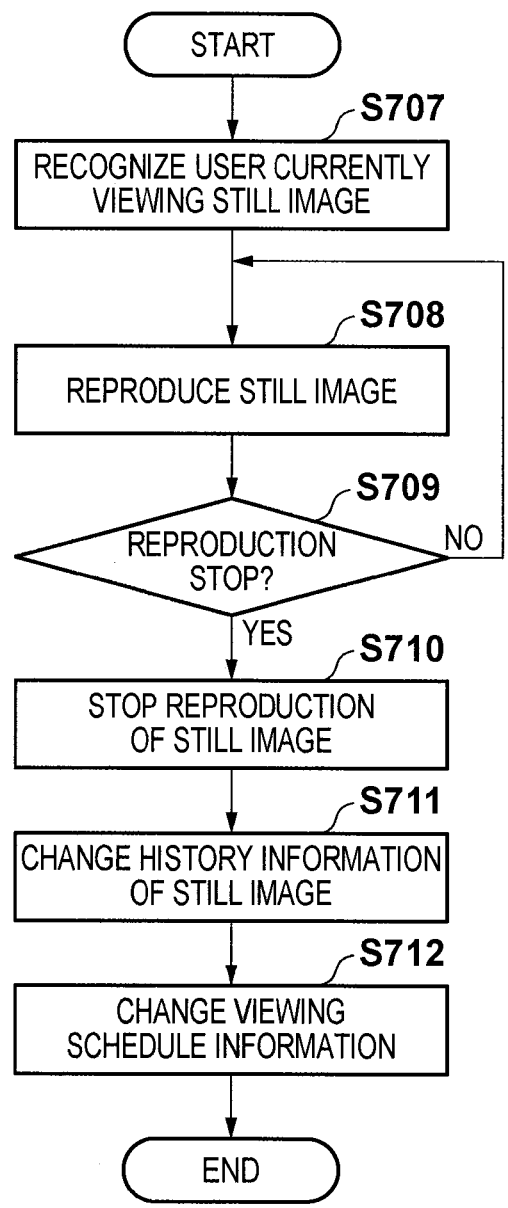

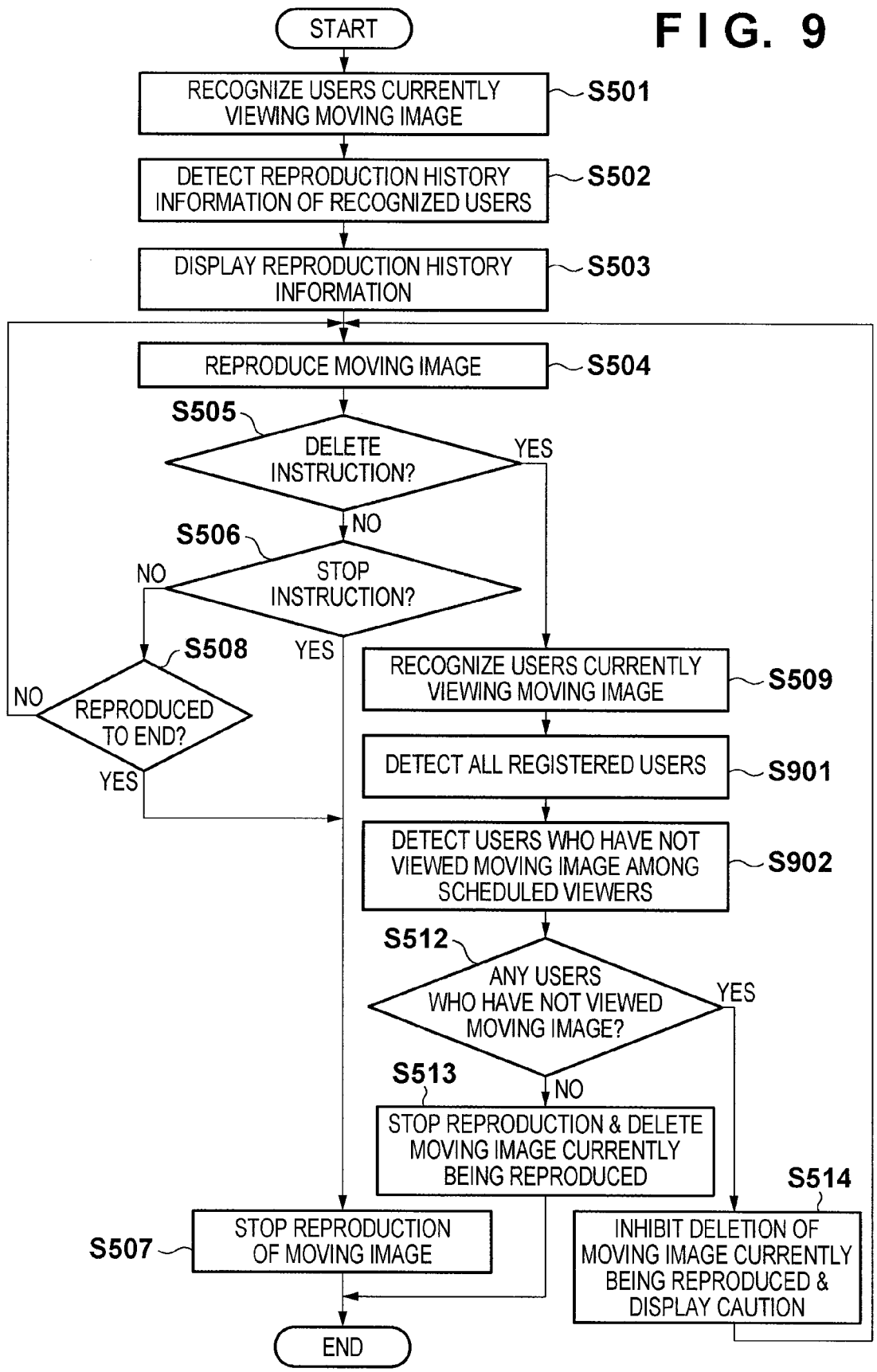

REPRODUCTION APPARATUS AND CONTROL METHOD THEREOF

BACKGROUND OF THE INVENTION

1. Field of the Invention

The present invention relates to deletion of reproduced content.

2. Description of the Related Art

Conventionally, apparatuses that record content such as moving images, audio, still images or the like to recording media and reproduce recorded content from recording media are known. Apparatuses that automatically delete viewed content (broadcast programs and other programs) from recorded content are also known (e.g., see Japanese Patent Laid-Open No. 2001-210017).

However, when one user deletes viewed content, other users who had intended to view the deleted content are no longer able to do so.

SUMMARY OF THE INVENTION

The present invention has been made in consideration of the aforementioned problems, and realizes a technique for preventing one of a plurality of users who want to view the same content from accidentally deleting content that other users have not viewed.

In order to solve the aforementioned problems, the present invention provides a reproduction apparatus comprising: a reproduction unit configured to reproduce a content from a recording medium; a recognition unit configured to recognize users who are viewing the content reproduced by the reproduction unit; a generation unit configured to generate reproduction history information indicating, for each of a plurality of users, a portion that the user has viewed in the content, based on a recognition result of the recognition unit; a deletion unit configured to delete the content from the recording medium, in response to an instruction to delete the content; and a control unit configured to control the deletion unit, based on the reproduction history information, wherein the control unit inhibits deletion of the content by the deletion unit, in a case where a user who has not viewed the content is included among the plurality of users included in the reproduction history information.

In order to solve the aforementioned problems, the present invention provides a reproduction apparatus comprising: a reproduction unit configured to reproduce a content from a recording medium; a recognition unit configured to recognize users who are viewing the content reproduced by the reproduction unit; a generation unit configured to generate viewing schedule information indicating users who are scheduled to view the content; and a control unit configured to control a display unit so as to make an inquiry as to whether to delete the content, in response to reproduction of the content being stopped, in a case where a user other than users recognized by the recognition unit during reproduction of the content is included among users indicated by the viewing schedule information.

In order to solve the aforementioned problems, the present invention provides a reproduction apparatus comprising: a reproduction unit configured to reproduce image data from a recording medium; a recognition unit configured to recognize users in response to reproduction of selected image data; and a control unit configured to control whether to delete the selected image data from the recording medium, based on users recognized by the recognition unit and schedule information for distinguishing whether each of a plurality of users is scheduled to reproduce the selected image data.

In order to solve the aforementioned problems, the present invention provides a reproduction apparatus comprising: a reproduction unit configured to reproduce image data from a recording medium; a recognition unit configured to recognize users in response to reproduction of selected image data; and a control unit configured to inhibit deletion of the selected image data from the recording medium, in a case where there is a user, other than users recognized by the recognition unit, who has not reproduced the selected image data among a plurality of predetermined users.

In order to solve the aforementioned problems, the present invention provides a control method of a reproduction apparatus which produces a content in a recording medium, the method comprising: a recognition step of recognizing users who are viewing the reproduced content; a generation step of generating reproduction history information indicating, for each of a plurality of users, a portion that the user has viewed in the content, based on a recognition result in the recognition step; a deletion step of deleting the content from the recording medium, in response to an instruction to delete the content; a control step of controlling deletion of the content, based on the reproduction history information, wherein, in the control step, deletion of the content is inhibited, in a case where a user who has not viewed the content is included among the plurality of users included in the reproduction history information.

In order to solve the aforementioned problems, the present invention provides a control method of a reproduction apparatus which reproduces a content in a recording medium, the method comprising: a recognition step of recognizing users who are viewing the reproduced content; a generation step of generating viewing schedule information indicating users who are scheduled to view the content; and a control step of controlling a display unit so as to make an inquiry as to whether to delete the content, in response to reproduction of the content being stopped, in a case where a user other than users recognized in the recognition step during reproduction of the content is included among users indicated by the viewing schedule information.

In order to solve the aforementioned problems, the present invention provides a control method of a reproduction apparatus which reproduces image data in a recording medium, the method comprising: a recognition step of recognizing users in response to reproduction of selected image data; and a control step of controlling whether to delete the selected image data from the recording medium, based on users recognized in the recognition step and schedule information for distinguishing whether each of a plurality of users is scheduled to reproduce the selected image data.

In order to solve the aforementioned problems, the present invention provides a control method of a reproduction apparatus which reproduces image data in a recording medium, the method comprising: a recognition step of recognizing users in response to reproduction of selected image data; and a control step of inhibiting deletion of the selected image data from the recording medium, in a case where there is a user, other than users recognized by the recognition unit, who has not reproduced the selected image data among a plurality of predetermined users.

According to the present invention, one of a plurality of users who want to view the same content can be prevented from accidentally deleting content that other users have not viewed.

Further features of the present invention will become apparent from the following description of exemplary embodiments (with reference to the attached drawings).

BRIEF DESCRIPTION OF THE DRAWINGS

FIG. 3 is a diagram illustrating a display screen at the time of still image reproduction.

FIGS. 4A-4D are diagrams illustrating a structure of management information.

FIG. 5 is a flowchart showing processing at the time of moving image reproduction in the first embodiment.

FIGS. 7A-7B are flowcharts showing generation and updating of history information at the time of moving image and still image reproduction in the first embodiment.

FIG. 9 is a flowchart showing processing during reproduction of a moving image in the third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A reproduction apparatus of the present invention is realized by an apparatus that records and reproduces content (broadcast programs and other programs) consisting of moving images, still images, audio or arbitrary combinations thereof. As for the reproduction apparatus according to the present embodiment, examples include a personal computer having an imaging device such as a web camera, a recording apparatus or reproduction apparatus connected to a digital TV, a digital camcorder, and a game console.

Apparatus Configuration

First, a configuration of the reproduction apparatus according to the present embodiment will be described, with reference to FIG. 1.

Figure 1:
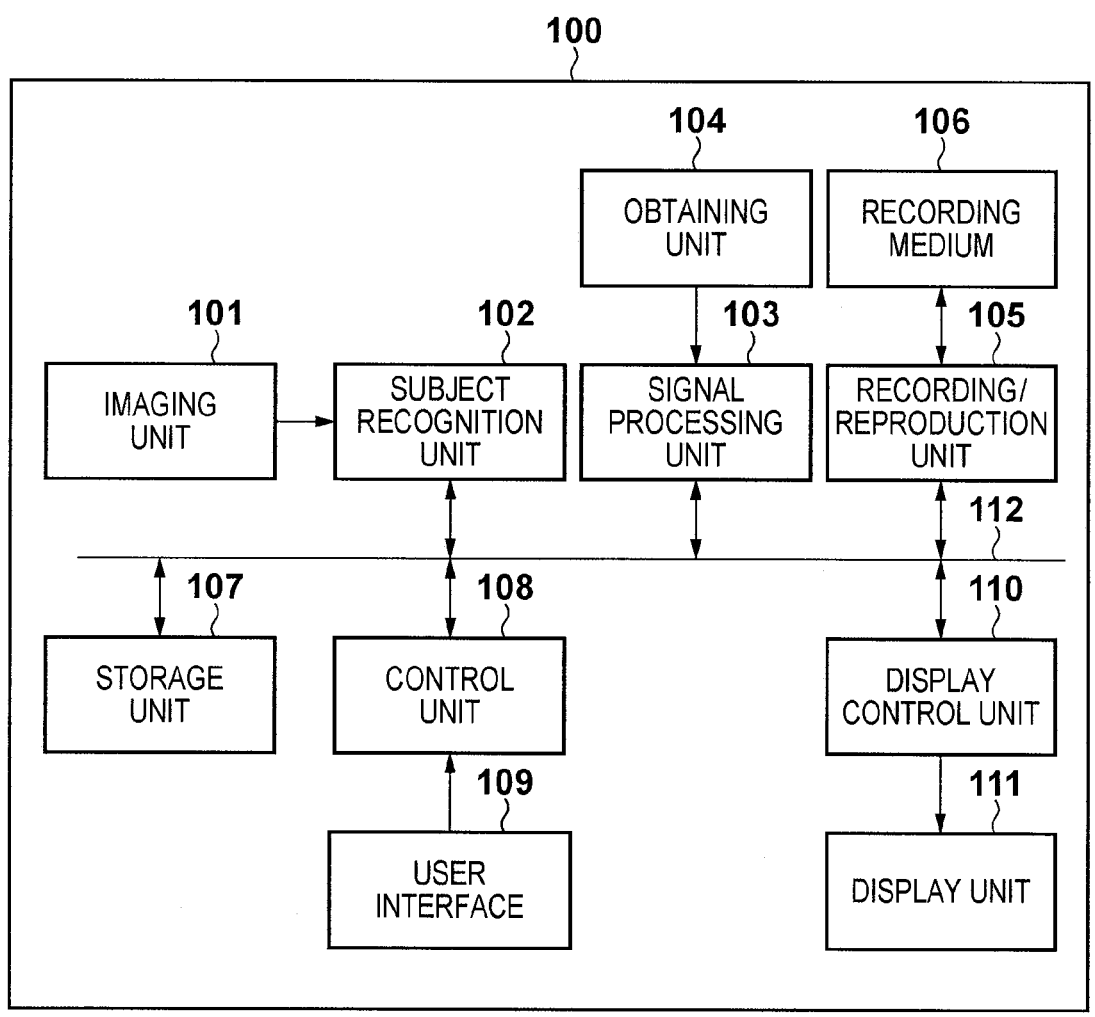
FIG. 1 is a block diagram of a reproduction apparatus of an embodiment according to the present invention.

In FIG. 1, an imaging unit 101 is equipped with a CMOS image sensor or the like, captures an image of a user (subject) who is viewing a moving image or a still image and/or listening to audio reproduced by a reproduction apparatus 100, using photoelectric conversion, and outputs image data resulting from the image capture to a subject recognition unit 102. The subject recognition unit 102 executes face recognition on the image data output from the imaging unit 101, detects a person's face included in the image data, and outputs feature information (hereinafter, face information) relating to the detected face to a control unit 108. A signal processing unit 103 performs predetermined signal processing on moving image, audio or still image data obtained with an obtaining unit 104 to change the format thereof, and sends the processed data to a recording/reproduction unit 105. Also, the signal processing unit 103, at the time of image reproduction, generates display signals and/or audio signals from the image data and/or audio data reproduced by the recording/reproduction unit 105, and sends the generated signals to the display control unit 110. The recording/reproduction unit 105 records the data acquired from the signal processing unit 103 to a recording medium 106. Also, the recording/reproduction unit 105 reads out moving image, audio or still image data recorded in the recording medium 106. The recording medium 106 is a recording medium capable of being arbitrarily read and written such as a hard disk (HDD) or a flash memory.

A storage unit 107 stores management information relating to moving image, audio or still image data recorded in the recording medium 106, as will be discussed later. The control unit 108 is provided with a microcomputer or a central processing unit (CPU), a memory and the like, and controls operation of the various units of the reproduction apparatus 100, in accordance with programs stored in the memory. A user interface (UI) 109 includes various types of switches operable by a user, receives operation inputs by a user, and outputs the received inputs to the control unit 108. A display control unit 110, in accordance with a control command from the control unit 108, outputs a moving image, still image or the like read out from the recording medium by the recording/reproduction unit 105 or reproduction history information of users which will be discussed later to a display unit 111 to be displayed. The display unit 111 includes a liquid crystal panel or the like. A bus 112 functions as a transmission path for transmitting and receiving data, various types of control commands, and the like between the units of the reproduction apparatus 100.

In the reproduction apparatus 100, the obtaining unit 104 includes a communication unit capable of connecting to a well-known camera or microphone or network. The obtaining unit 104 obtains moving image, audio or still image data, and outputs the obtained data to the signal processing unit 103. The signal processing unit 103 performs predetermined signal processing on the moving image, audio or still image data obtained with the obtaining unit 104, and sends the obtained data to the recording/reproduction unit 105. The recording/reproduction unit 105 records the moving image, audio or still image data to the recording medium 106. In the present embodiment, the recording/reproduction unit 105 manages moving image, audio or still image data recorded in the recording medium 106 as a file, in accordance with the predetermined file system of the reproduction apparatus 100.

User Registration

Next, user registration by the reproduction apparatus 100 of the present embodiment will be described.

When a user operates the UI 109 to instruct new user registration, the control unit 108 controls the imaging unit 101 to capture an image of the user's face. Image data captured by the imaging unit 101 is sent to the subject recognition unit 102. The subject recognition unit 102 detects a person's face from the image data captured with the imaging unit 101, using a well-known face recognition technique, and outputs the detected face information to the control unit 108.

Meanwhile, the control unit 108 controls the display control unit 110 to display on the display unit 111 an input screen for allowing unique information such as a username to be input. The user operates the UI 109 and inputs user identification information such as a username. The control unit 108 associates and stores the face information obtained from the subject recognition unit 102 and the user identification information input using the UI 109 in the storage unit 107.

Content Management Information

Next, the management information of image files recorded in the recording medium 106 will be described, with reference to FIGS. 4A-4D.

The control unit 108 generates management information and stores the generated management information in the storage unit 107, and also updates the contents of management information whenever an image file is newly recorded to the recording medium 106. FIG. 4A illustrates the structure of management information 401. The management information 401 is constituted by a header 401a and entries 402 corresponding to each image file. FIG. 4B illustrates the structure of each entry 402. Each entry 402 includes filename information 402a of a corresponding image file, and link information 402b to the corresponding image file recorded in the recording medium 106. The recording position of the corresponding image file can be detected using the link information 402b. FIG. 4C illustrates image file information 403. Image file information 403 includes image file header information 403a, image filename 403b, image file path information 403c, and link information 403d to history information of the image file (content). The recording position of history information relating to this image file in the recording medium 106 can be detected using this link information 403d.

FIG. 4D illustrates history information 404 and 405. History information 404 is the history information of a moving image file, and history information 405 is the history information of a still image file. History information 404 and 405 respectively include header information 404a and 405a and username information 404b and 405b. Also, history information 404 and 405 respectively include initial reproduction date-time information 404c and 405c indicating the date and time at which the content was initially reproduced, and last reproduction date-time information 404d and 405d indicating the date and time at which the content was last reproduced. Furthermore, history information 404 and 405 respectively include viewing schedule information 404e and 405e of each user. Viewing schedule information 404e and 405e is information for distinguishing that the moving image or still image is scheduled to be subsequently reproduced by respective users. Also, moving image history information 404 includes reproduction history information 404f including the reproduction start position and reproduction stop position in corresponding moving image data, and the reproduction dates and times thereof. In the case where a user has reproduced a plurality of portions of a moving image, the control unit 108 generates reproduction start position, reproduction stop position and the reproduction dates and times for each reproduced portion, and adds the generated information to the history information 404. Also, the control unit 108, in the case where content is reproduced, executes face recognition of users who are viewing an image and/or listening to audio that is reproduced, and generates history information 404 or 405 for each user who is recognized, as will be discussed later.

Generation and Updating of History Information

Next, generation and updating of history information at the time of image reproduction will be described, with reference to FIGS. 7A-7B. FIG. 7A shows the processing at the time of moving image reproduction, and FIG. 7B shows the processing at the time of still image reproduction. Note that generation and updating of history information in FIGS. 7A-7B are realized by the control unit 108 executing a control program (software) stored in the storage unit 107 and controlling the various units.

First, updating of history information at the time of moving image reproduction in FIG. 7A will be described.

In FIG. 7A, the processing is started when a user operates the UI 109 to select a desired image from a plurality of moving image files recorded in the recording medium 106 and instruct reproduction. First, the control unit 108, as mentioned previously, executes face recognition of the user who is viewing the moving image and listening to the audio that are reproduced, using the imaging unit 101 and the subject recognition unit 102, and obtains face information of the user (S701). Next, the control unit 108 issues a control command to reproduce the designated moving image file to the recording/reproduction unit 105, and reproduces the designated moving image file from the recording medium 106 (S702). The control unit 108 then controls the signal processing unit 103 and the display control unit 110 to reproduce the image of the reproduced moving image file on the display unit 111. Note that the audio is output from a speaker (not shown).

When reproduction is thus started, the control unit 108 detects the position at which normal reproduction was started, and stores the detected position in the storage unit 107. The control unit 108, in the case where the UI 109 is operated during reproduction of the moving image and a fast forward instruction is received, sends a control command to the recording/reproduction unit 105 so as to perform fast forward reproduction, and also detects the position at which fast forward reproduction was started as the reproduction stop position and stores the detected position in the storage unit 107. Also, at this time, the control unit 108 detects the reproduction dates and times based on the output of a timer (not shown), and stores the detected reproduction dates and times in the storage unit 107.

During reproduction of a moving image, the control unit 108 thus generates information indicating the reproduction start position, reproduction stop position and reproduction dates and times, and stores the generated information in the storage unit 107. The control unit 108, when there is a reproduction stop instruction from the UI 109 (S703), then sends a control command to the recording/reproduction unit 105 so as to stop the moving image reproduction (S704). The control unit 108 then updates the reproduction history information of the moving image file that has just been reproduced, based on the information indicating the reproduction start position, reproduction stop position and reproduction dates and times stored in the storage unit 107 and the face information of the user recognized at S701 (S705). That is, the control unit 108 detects the history information 404 of the designated moving image file from the storage unit 107, and detects the username of a registered user by comparing the face information of the user recognized at S701 with the face information of registered users. The control unit 108 determines whether history information of the detected user is stored in the history information of the moving image file. If history information of the detected user is stored, the control unit 108 updates the contents of the corresponding history information of the user stored in the storage unit 107, based on the information indicating the reproduction start position, stop position and reproduction dates and times. Also, if history information of the detected user is not stored, history information of the user is newly generated and stored in the storage unit 107.

Next, the control unit 108 changes the viewing schedule information of the designated moving image file (S706). That is, the control unit 108 determines whether history information of the user detected at S701 is stored in the history information of the moving image file. If the history information of the detected user is stored, the control unit 108 automatically changes the viewing schedule information included in the history information to a state indicating viewing not scheduled.

Next, updating of history information at the time of still image reproduction in FIG. 7B will be described.

The processing of FIG. 7B is started when a user operates the UI 109 to select a desired image from a plurality of still image files recorded in the recording medium 106 and instruct reproduction. First, the control unit 108, as mentioned previously, controls the imaging unit 101 and the subject recognition unit 102 to execute face recognition of the user who is looking at the reproduced still image, and obtains face information of the user (S707). Next, the control unit 108 issues a control command to the recording/reproduction unit 105 so as to reproduce the designated still image file, and reads out the designated still image file from the recording medium 106 and reproduces the read still image file (S708). The control unit 108 then controls the signal processing unit 103 and the display control unit 110 to display the image of the reproduced still image file on the display unit 111. Next, when there is a reproduction stop instruction from the UI 109 (S709), the control unit 108 sends a control command to the recording/reproduction unit 105 so as to stop the still image reproduction (S710). The control unit 108 then updates the reproduction history information of the still image file that has just been reproduced, based on information indicating the reproduction start position, stop position and reproduction dates and times stored in the storage unit 107 and the face information of the user recognized at S708 (S711). This update processing is similar to when updating the history information of a moving image file. Next, the control unit 108 updates the viewing schedule information of the still image file that has just been reproduced, based on the face information of the user recognized at S708 (S712). This update processing is similar to when updating the history information of a moving image file.

Note that in the above processing, a configuration is adopted in which, in the case where history information of the user detected at S701 or S707 is not stored, history information of the user is newly generated and stored in the storage unit 107. Alternatively, a configuration may be adopted in which, when users have been recognized at the time of moving image or still image reproduction, history information of all recognized user is generated for all moving image and still image files and stored, for example. In this case, a predetermined value indicating null is stored in the initial reproduction dates and times 404c and 405c, the last reproduction dates and times 404d and 405d and the reproduction history information 404f of the history information of moving images and still images that have not been reproduced. Also, in this case, the viewing schedule information is set to a state indicating viewing not scheduled.

Also, although the viewing schedule information of the recognized user is automatically changed to a state indicating viewing not scheduled at S706 or S712, a configuration may be adopted in which an inquiry is made to the user as to whether to set the viewing schedule information to indicate viewing scheduled or viewing not scheduled, for example. Also, with regard to moving images, a configuration may be adopted in which the viewing schedule information is changed to indicate viewing not scheduled if the percentage of the portion that has been reproduced relative to the reproduction length of the moving image is greater than or equal to a threshold or if the moving image has been reproduced to the end, and the state of viewing schedule information is not changed in other cases.

Setting of Viewing Schedule

Next, setting of a viewing schedule will be described. The user is able to operate the UI 109 in a state where reproduction is stopped to set a viewing schedule for a recorded moving image or still image. First, the user operates the UI 109 to select a moving image or still image recorded in the recording medium 106 and instruct setting of a viewing schedule. The control unit 108, when there is a viewing schedule setting instruction, sends a control command to the display control unit 110 so as to display a settings screen on the display unit 111. Also, the control unit 108, as mentioned previously, executes face recognition of the user who instructed setting of the viewing schedule. The user operates the UI 109 to set the selected moving image or still image to viewing scheduled or viewing not scheduled. The control unit 108, when there is a user instruction, detects the history information of the selected moving image or still image from the storage unit 107, and changes the state of the viewing schedule information 404e or 405e stored in the history information of the recognized user in the detected history information in accordance with the user instruction.

Deletion

Figure 6:
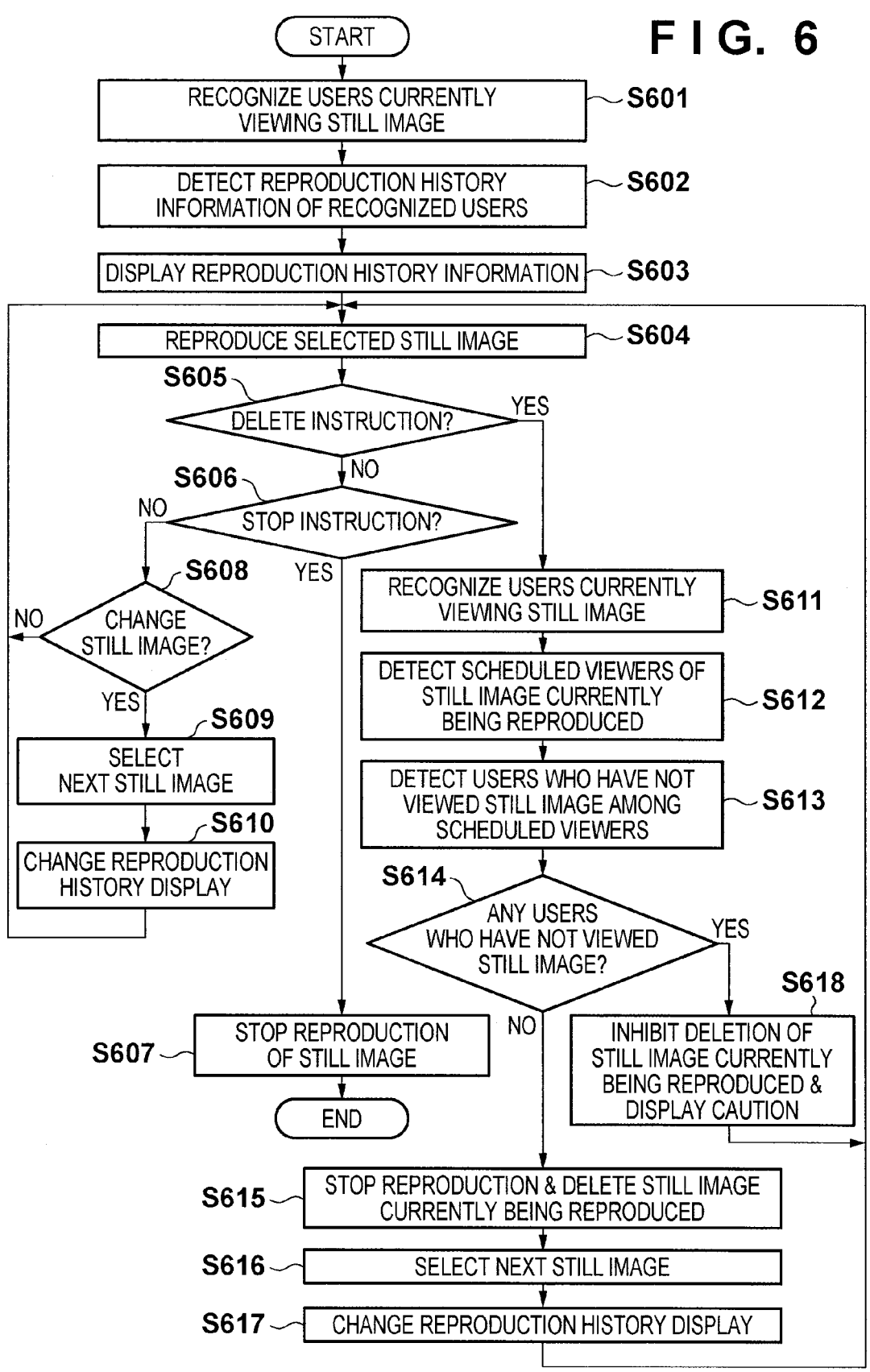
FIG. 6 is a flowchart showing processing at the time of still image reproduction in the first embodiment.

Next, deletion of moving image or still image at the time of image reproduction will be described with reference to FIG. 5 and FIG. 6. FIG. 5 shows the processing at the time of moving image reproduction, and FIG. 6 shows the processing at the time of still image reproduction. Note that processing of FIG. 5 and FIG. 6 is executed by the control unit 108 controlling the various units.

First, the processing at the time of moving image reproduction in FIG. 5 will be described.

In FIG. 5, the processing is started when a user operates the UI 109 to select any of a plurality of moving image files recorded in the recording medium 106 and instruct reproduction start. First, the control unit 108, executes face recognition of all users who are currently viewing the reproduced moving image, using the imaging unit 101 and the subject recognition unit 102, and obtains face information of the users (S501). The control unit 108 then detects the usernames of registered users by comparing the face information of each recognized user with the face information of registered users stored in the storage unit 107. The control unit 108 then detects reproduction history information stored in the history information of the detected users (S502). Next, the control unit 108 sends a control command to the display control unit 110 so as to display on the display unit 111 reproduction history information for distinguishing the portions that each user has and has not reproduced, based on the reproduction history information (S503). At this time, the control unit 108 causes the reproduction history information to be displayed, so as to be able to distinguish, from the reproduction history information of the other users recognized at S501, portions having the same reproduction dates and times as the currently selected user as reproduced screens that these users were watching together.

Figure 2:
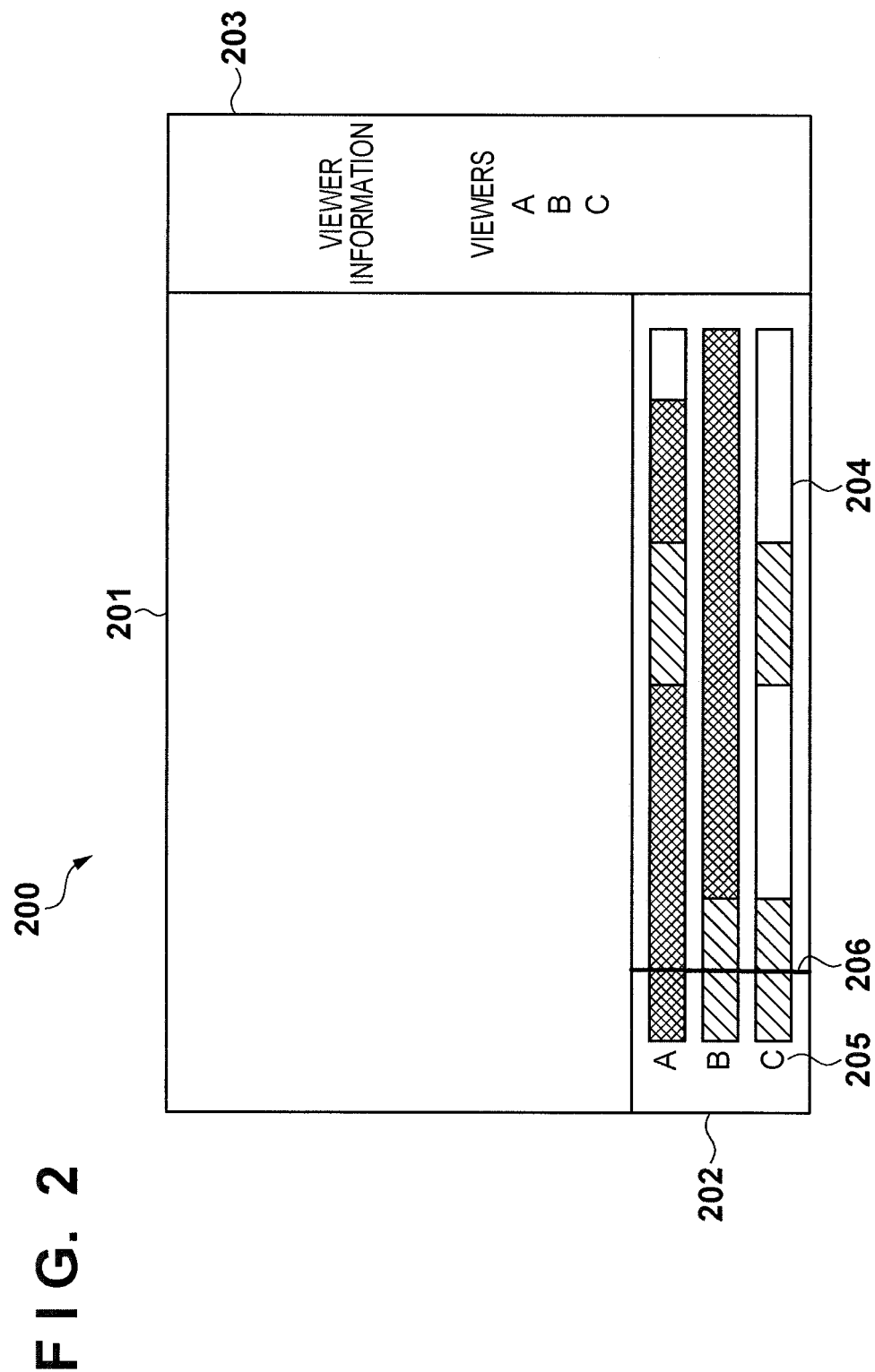
FIG. 2 is a diagram illustrating a display screen at the time of moving image reproduction.

FIG. 2 illustrates a display screen 200 at the time of moving image reproduction, with the display screen 200 including a moving image display area 201, a reproduction history information display area 202, and an area 203 for displaying information indicating usernames recognized at the start of reproduction.

Usernames 205 of recognized users, here viewers A, B and C, are displayed in the reproduction history information display area 202, and reproduction histories 204 are further displayed in the form of progress bars. In the reproduction histories 204, portions that have been reproduced and portions that have not been reproduced are distinguishably displayed with different colors or shapes. For example, in FIG. 2, the black displayed portions are the portions that have been reproduced and the white displayed portions are the portions that have not been reproduced. Also, the portions shown with diagonal lines are periods during which a plurality of the users were watching the reproduction screen together. The length of the reproduction histories 204 corresponds to the reproduction length of the moving image currently being reproduced. The control unit 108 calculates the display positions corresponding to the reproduced portions in the case where the length of the reproduction histories 204 is taken as the reproduction length of the moving image, based on the reproduction length of the designated moving image and the reproduction start times and end times of the reproduced portions, and displays the result on the screen 200. Also, an indicator 206 indicates the reproduction position in the moving image currently being reproduced.

Note that the users recognized at S501 are already registered, although in the case where the reproduction history of a recognized user is not stored in the history information of the designated moving image, this will be the first time for that user to reproduce the designated moving image. Thus, with regard to a registered user whose reproduction history information is not stored, the entire period is set as a period during which the moving image has not been reproduced.

Returning to the flowchart of FIG. 5, the control unit 108 sends a control command to the recording/reproduction unit 105 so as to reproduce the designated moving image file (S504). The recording/reproduction unit 105 reproduces the designated moving image file. The reproduced moving image file is processed by the signal processing unit 103, and displayed by the display control unit 110 in the movie display area 201 of the display unit 111 shown in FIG. 2.

After starting reproduction of the moving image, the control unit 108 determines whether there has been a delete instruction from the UI 109 (S505). If there is not a delete instruction, the control unit 108 determines whether there has been a reproduction stop instruction (S506). If there is reproduction stop instruction, the control unit 108 stops reproduction of the moving image by the recording/reproduction unit 105, and also stops moving image display and reproduction history information display (S507). Also, if there is not a reproduction stop instruction, the control unit 108 determines whether the moving image has been reproduced to the end (S508). When the moving image has been reproduced to the end, the control unit 108 stops reproduction of the moving image by the recording/reproduction unit 105, and also stops moving image display and reproduction history information display (S507). Also, if the moving image has not been reproduced to the end, the processing returns to S504.

Also, when there is a delete instruction at S505, the control unit 108 executes face recognition of users whose are currently viewing the moving image, similarly to S501 (S509). The control unit 108 then detects users who are scheduled to view the moving image currently being reproduced, based on viewing schedule information of each user stored in the history information of that moving image (S510). Next, the control unit 108 compares the users recognized at S509 with the users who are scheduled to view the moving image, and detects users who have not completed viewing of the moving image. Here, users who are scheduled to view the moving image other than those who were recognized at S509 are detected as users who have not viewed the moving image. The control unit 108 then determines whether there are any users who have not viewed the moving image (S512), and if there are no such users, controls the recording/reproduction unit 105 to stop reproduction of the moving image and delete the moving image file currently being reproduced from the recording medium 106 (S513). Also, the control unit 108 deletes the history information corresponding to the deleted moving image file from the storage unit 107. Also, if there is a user who has not viewed the moving image currently being reproduced at S512, the control unit 108 inhibits deletion of that moving image. The control unit 108 then controls the display control unit 110 to display caution information on the display unit 111 indicating that the moving image cannot be deleted because there is a user who has not viewed the moving image (S514).

Next, processing at the time of still image reproduction in FIG. 6 will be described.

In FIG. 6, the processing is started when a user operates the UI 109 to select any of a plurality of still image files recorded in the recording medium 106 and instruct the start of reproduction. First, the control unit 108 executes face recognition of all users who are currently viewing the reproduced image, using the imaging unit 101 and the subject recognition unit 102, and obtains face information of the users. The control unit 108 then detects the usernames of registered users, by comparing the face information of each recognized user with the face information of registered users stored in the storage unit 107 (S601). Next, the control unit 108 detects the reproduction history information of all still image files (S602). The control unit 108 then sends a control command to the display control unit 110, so as to display on the display unit 111, for each recognized user, the still image whose reproduction was instructed and reproduction history information for distinguishing whether a predetermined number of still images before and after the reproduced still image have or have not been reproduced (S603). At this time, the control unit 108 causes the reproduction history information to be displayed so as to be able to distinguish, based on the reproduction history information of the other users recognized at S601, still images having the same reproduction dates and times as the currently selected user as reproduction screens that these users were watching together.

FIG. 3 illustrates a display screen 300 at the time of still image reproduction, with the display screen 300 including a still image display area 301, a reproduction history information display area 302, and an area 303 for displaying information indicating usernames recognized at the start of reproduction.

Recognized usernames 305, here viewers A, B and C, are displayed in the reproduction history information display area 302. Also, the reproduction histories 304 of the still image currently being reproduced and the still images reproduced before and after the current still image are displayed. A plurality of icons 304a, 304b and 304c corresponding to the still images are displayed in the reproduction histories 304. The icon 304a indicates still images that have been reproduced, and the icon 304b indicates still images that have not been reproduced. The icon 304a indicating still images that have been reproduced and the icon 304b indicating still images that have not been reproduced are distinguishably displayed with different colors or shapes. Also, the icon 304c shown with diagonal lines indicates still images reproduced in a state where a plurality of the users were watching the reproduction screen together. Also, the icons displayed vertically in the same positions in the reproduction histories 304 of the users indicate the same still image. Also, an indicator 306 indicates the reproduction position of the still image currently being reproduced. Although the control unit 108 causes reproduction histories relating to four screens of still images before and after the still image currently being reproduced to be displayed in FIG. 3, the reproduction histories of more still images may be displayed. Also, although the icons of the still images are displayed side by side in order of recording date and time in the present embodiment, a configuration may be adopted in which the icons are arranged in accordance with a condition other than recording date and time.

Note that the users recognized at S601 are already registered, although in the case where the reproduction history of a recognized user is not stored in the history information of the designated still image, this will be the first time for that user to reproduce the designated still image. Thus, with regard to a registered user whose reproduction history information is not stored, the designated still image is set as a still image that has not been reproduced.

Returning to the flowchart of FIG. 6, the control unit 108 sends a control command to the recording/reproduction unit 105 so as to reproduce the designated still image file (S604). The recording/reproduction unit 105 reproduces the designated moving image file. The reproduced moving image file is processed by the signal processing unit 103, and is displayed by the display control unit 110 in the still image display area 301 of the display unit 111 shown in FIG. 3.

Next, the control unit 108 determines whether there has been a delete instruction from the UI 109 (S605). If there is not a delete instruction, the control unit 108 determines whether there has been a reproduction stop instruction from the UI 109 (S606). When there is a reproduction stop instruction, the control unit 108 then stops reproduction of the still image by the recording/reproduction unit 105, and also stops still image display and reproduction history information display (S607).

Also, if there is not a reproduction stop instruction, the control unit 108 determines whether there has been a still image change instruction from the UI 109 (S608). If there has been a still image change instruction, the control unit 108 selects the next still image in order of recording date and time (S609). The control unit 108 then changes the reproduction history display according to the change in the still image to be reproduced, returns to S604, and sends a control command to the recording/reproduction unit 105 so as to reproduce the designated still image file.

Also, when there is a delete instruction at S605, the control unit 108 executes face recognition of the users currently viewing the still image, similarly to S601 (S611). The control unit 108 then detects users who are scheduled to view the still image currently being reproduced, based on the viewing schedule information of users stored in the history information of that still image (S612). Next, the control unit 108 compares the users recognized at S611 with the users who are scheduled to view the still image, and detects users who have not viewed the still image. Here, users who are scheduled to view the still image other than those who were recognized at S611 are detected as users who have not viewed the still image. The control unit 108 then determines whether there are any users who have not viewed the still image (S614), and if there are no such users, controls the recording/reproduction unit 105 to stop still image reproduction and delete the still image file currently being reproduced from the recording medium 106 (S615). The control unit 108 deletes the history information corresponding to the deleted still image file from the storage unit 107. The control unit 108 then selects the next still image (S616), changes the reproduction history display according to the change in the still image to be reproduced, returns to S604, and sends a control command to the recording/reproduction unit 105 so as to reproduce the designated still image file (S617). Also, if there is a user who has not viewed the still image currently being reproduced at S614, the control unit 108 inhibits deletion of that still image. The control unit 108 then controls the display control unit 110 to display caution information on the display unit 111 indicating that the still image cannot be deleted because there is a user who has not viewed the still image (S618).

Note that the generation and updating of history information shown in FIGS. 7A-7B are executed at the same time as the processing of FIG. 5 and FIG. 6.

In this way, in the present embodiment, when there is a delete instruction during reproduction of a moving image or a still image, users watching the reproduction screen are recognized, and it is determined whether there are any users who are scheduled to view the moving image or still image currently being reproduced other than the recognized users. If there are any users who are scheduled to view the moving image or still image currently being reproduced other than the recognized users, it is determined that there are users who have not viewed the moving image or still image, and deletion is inhibited. Also, if there are no users who are scheduled to view the moving image or still image currently being reproduced other than the recognized users, the moving image or still image is deleted.

Thus, in the case where there are other users who are scheduled to view content whose deletion is instructed, accidentally deleting the content can be prevented.

Note that in the present embodiment, a configuration is adopted in which users are recognized at the start of moving image or still image reproduction, the reproduction history of recognized users is displayed, and the reproduction history display is not changed even if the users fluctuate during reproduction. However, a configuration may be adopted in which a change in users during reproduction is detected, and the displayed reproduction history information is changed in accordance with the users whenever a change in users is detected.

A configuration may also be adopted in the processing of FIGS. 7A-7B in which a change in users during reproduction is detected, and reproduction history information is updated whenever a change in users is detected.

Also, although recognition of users is performed based on the face information of users in the present embodiment, users can also be recognized with methods other than this. For example, a function for recognizing biological information such as fingerprints or a function for reading information on an ID card possessed by users may be installed in the reproduction apparatus 100.

Also, a configuration may be adopted in which, when displaying caution information at S514 or S618, information indicating the usernames of users who have not viewed the moving image or still image is displayed. Also, a configuration may be adopted in which, if, in the case where there has been a delete instruction, there are other users who have not reproduced the moving image or still image currently being reproduced at all, despite there not being any users who have not viewed the moving image or still image among the scheduled viewers, information indicating that this is the case is displayed and the moving image or still image is deleted after checking with those users as to whether or not to delete the moving image or still image.

Second Embodiment

Next, the second embodiment will be described. In the present embodiment, the configuration and functions of the reproduction apparatus are similar to the first embodiment. In the second embodiment, in the case where there has been an instruction to stop reproduction of the moving image or still image currently being reproduced in addition to a delete instruction, it is determined whether there are any users who have not viewed the moving image or still image among the users who are scheduled to view the moving image or still image, and if there are no users who have not viewed the moving image or still image, an inquiry is made to the user as to whether or not to delete the moving image or still image.

Hereinafter, deletion of a moving image when reproduction is stopped in the second embodiment will be described, with reference to FIG. 8. Note that the processing of FIG. 8 is similarly realized by the control unit 108 executing a control program stored in the storage unit 107 and controlling the various units.

Figure 8:
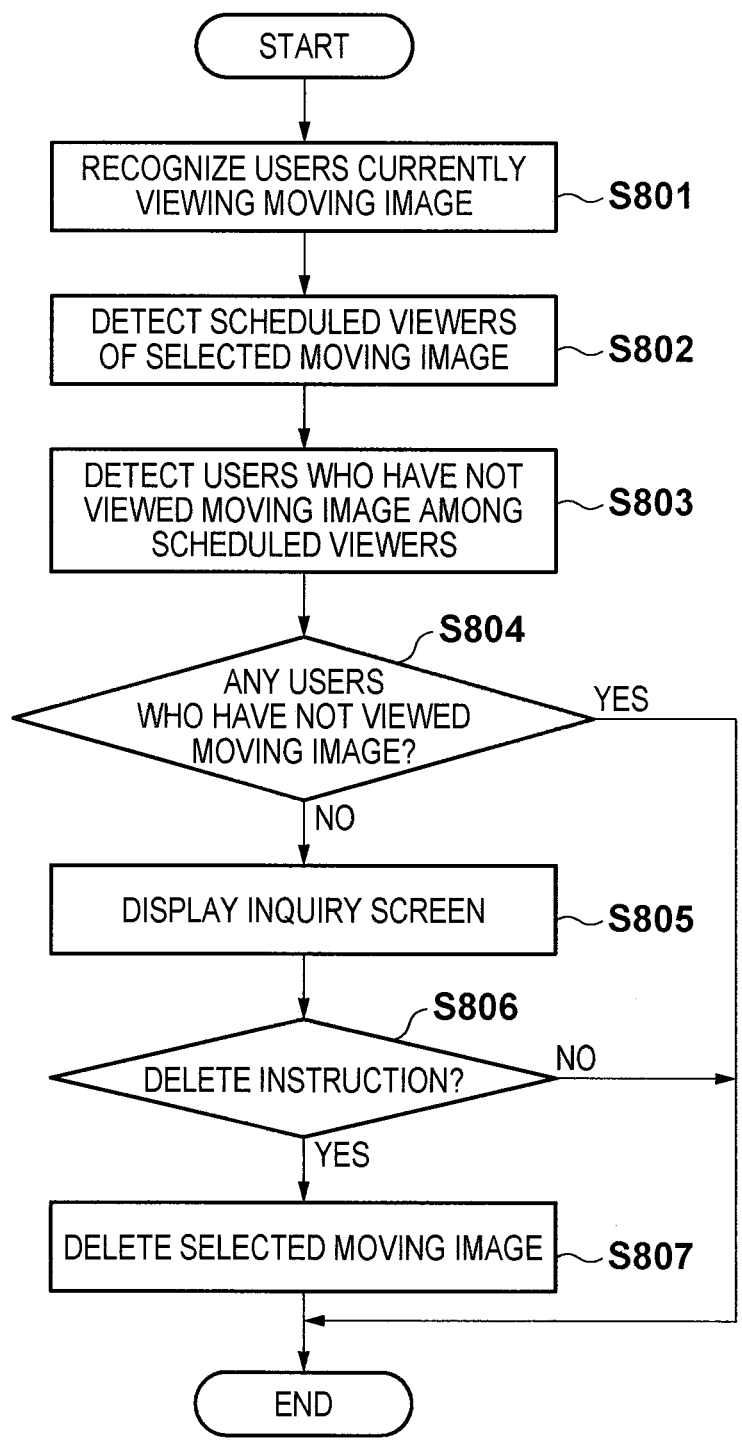
FIG. 8 is a flowchart showing processing while reproduction of a moving image is stopped in the second embodiment.

The processing of FIG. 8 is started when a reproduction stop instruction is received from the UI 109 in FIG. 5 or FIG. 6. The control unit 108 first executes face recognition of users who are currently viewing the reproduced moving image, similarly to S501 (S801). Next, the control unit 108 detects users who are scheduled to view the selected moving image, based on the viewing schedule information of users stored in the history information of that moving image (S802). Next, the control unit 108 compares the users recognized at S801 with the users who are scheduled to view the moving image, and detects users who have not viewed the moving image. Here, users scheduled to view the moving image other than those recognized at S801 are detected as users who have not viewed the moving image. The control unit 108 then determines whether there are any users who have not viewed the moving image (S804), and if there are no such users, controls the display control unit 110 to display a screen on the display unit 111 for making an inquiry to the user as to whether or not to delete the selected moving image (S805). The user operates the UI 109 to instruct whether or not to delete the moving image. If there has been a delete instruction from the UI 109 (S806), the control unit 108 controls the recording/reproduction unit 105 to delete the selected moving image file or still image file from the recording medium 106 (S807). Also, the control unit 108 deletes the history information corresponding to the deleted moving image file or still image file from the storage unit 107. Also, if there is a user who has not viewed the selected moving image or still image file at S804 or if an instruction not to delete the moving image is received at S806, the control unit 108 inhibits deletion of the moving image or still image file, and ends the processing.

In this way, in the present embodiment, users currently viewing content are recognized, in response to an instruction to stop reproduction of the content, and it is determined whether there are any users who are scheduled to view the moving image or still image currently being reproduced other than the recognized users. If there are no users who are scheduled to view the moving image or still image currently being reproduced other than the recognized users, content for which there are no other scheduled users can be easily deleted by making an inquiry to the user as to whether or not to delete the content.

Third Embodiment

Next, the third embodiment will be described. In the present embodiment, the configuration and functions of the reproduction apparatus are similar to the above Embodiments 1 and 2. In the third embodiment, in the case where there is a delete instruction during reproduction, it is determined whether the selected content has been reproduced by all of the registered users, not just by the users who are scheduled to view the selected content.

Hereinafter, processing at the time of moving image reproduction in the third embodiment will be described, with reference to FIG. 9. Note that since only the processing of S901 and S902 differs on comparison of FIG. 9 with FIG. 5, in FIG. 9 the same reference signs are given to processing that is similar to FIG. 5, and description thereof is omitted. The processing of FIG. 9 is similarly realized by the control unit 108 executing a control program stored in the storage unit 107 and controlling the various units.

In FIG. 9, after recognizing the users currently viewing the moving image in S509, the control unit 108 detects all of the registered users (S901). Users who have not viewed the moving image currently being reproduced are detected from the registered users, based on the initial reproduction date-time information of each user stored in the history information of that moving image. Here, the control unit 108 determines whether the initial reproduction date-time information of any registered users other than the users recognized at S509 is stored. If the initial reproduction date-time information of all users other than the users recognized at S509 is stored, the control unit 108 determines that all registered users have viewed that moving image file and that there are no users who have not viewed the moving image. The subsequent processing is similar to FIG. 5.

Other Embodiments

Aspects of the present invention can also be realized by a computer of a system or apparatus (or devices such as a CPU or MPU) that reads out and executes a program recorded in a memory device to perform the functions of the above-described embodiment(s), and by a method, the steps of which are performed by a computer of a system or apparatus by, for example, reading out and executing a program recorded in a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-171321, filed Aug. 4, 2011, which is hereby incorporated by reference herein in its entirety.

What is claimed is:

1. A reproduction apparatus comprising:
a reproduction unit configured to reproduce a content from a recording medium;
a recognition unit configured to recognize users;
a management information processing unit configured to generate management information relating to the content including reproduction history information indicating, for each of a plurality of users, a portion that the user has viewed in the content, and viewing schedule information which is different from the history information and indicates whether each of the plurality of users is scheduled to view or not, based on a recognition result of the recognition unit;
a setting unit configured to set whether a user recognized by the recognition unit is scheduled to view or not the content in accordance with an instruction from the recognized user;

a receiving unit configured to receive, from a predetermined user recognized by the recognition unit, a deletion instruction for instructing to delete a designated content;

a deletion unit configured to delete the designated content from the recording medium in accordance with the deletion instruction; and a control unit configured to control the deletion unit, based on the viewing schedule information relating to the designated content, wherein the management information processing unit sets the viewing schedule information in accordance with a set result by the setting unit such that if it is set that viewing of the content is scheduled, the viewing schedule information indicates that the recognized user is scheduled to view the content, and if it is set that viewing of the content is not scheduled, the viewing schedule information indicates that the recognized user is not scheduled to view the content, the control unit inhibits deletion of the designated content by the deletion unit, in a case where the viewing schedule information indicates that a user other than the predetermined user is scheduled to view the designated content.

2. The apparatus according to claim 1,
wherein the control unit causes deletion of the designated content by the deletion unit, in a case where the viewing schedule information indicates that a user other than the predetermined user is not scheduled to view the designated content.

3. The apparatus according to claim 1,
wherein the control unit issues a caution, in a case where the viewing schedule information indicates that a user other than the predetermined user is scheduled to view the designated content.

4. The apparatus according to claim 1,
wherein the content include a moving image, a still image, audio, or an arbitrary combination thereof.

5. The apparatus according to claim 1,
wherein the recognition unit recognizes users in response to an instruction to delete the content.

6. The apparatus according to claim 1, wherein the deletion unit deletes the designated content in accordance with the deletion instruction received by the receiving unit during reproduction of the content.

7. A reproduction apparatus comprising:
a reproduction unit configured to reproduce a content from a recording medium;
a recognition unit configured to recognize users;
a management information processing unit configured to generate management information relating to the content including viewing schedule information which indicates whether each of the plurality of users is scheduled to view or not,
a setting unit configured to set whether a user recognized by the recognition unit is scheduled to view or not the content in accordance with an instruction from the recognized user;
a receiving unit configured to receive, from a predetermined user recognized by the recognition unit, a deletion instruction for instructing to delete a designated content;
a deletion unit configured to delete the designated content from the recording medium in accordance with the deletion instruction; and
a control unit configured to control the deletion unit, based on the viewing schedule information relating to the designated content, wherein the management information processing unit sets the viewing schedule information in accordance with a set result by the setting unit such that if it is set that viewing of the content is scheduled, the viewing schedule information indicates that the recognized user is scheduled to view the content, and if it is set that viewing of the content is not scheduled, the viewing schedule information indicates that the recognized user is not scheduled to view the content, and the control unit inhibits deletion of the designated content by the deletion unit, in a case where the viewing schedule information indicates that a user other than the predetermined user is scheduled to view the designated content.

8. The apparatus according to claim 7, wherein the deletion unit deletes the designated content in accordance with the deletion instruction received by the receiving unit during reproduction of the content.

9. A control method of a reproduction apparatus which reproduces a content in a recording medium, the method comprising:
a recognition step of recognizing users;
a management information processing step of generating management information relating to content including reproduction history information indicating, for each of a plurality of users, a portion that the user has viewed in the content, and viewing schedule information which is different from the history information and indicates whether each of the plurality of users is scheduled to view or not, based on a recognition result in the recognition step;
a setting step of setting whether a user recognized by the recognition step is scheduled to view or not the content in accordance with an instruction from the recognized user;
a receiving step of receiving, from a predetermined user recognized by the recognition step, a deletion instruction for instructing to delete a designated content;
a deletion step of deleting the designated content from the recording medium in accordance with the deletion instruction;
a control step of controlling deletion of the content, based on the viewing schedule information relating to the designated content,
wherein the management information processing step sets the viewing schedule information in accordance with a set result by the setting step such that if it is set that viewing of the content is scheduled, the viewing schedule information indicates that the recognized user is scheduled to view the content, and if it is set that viewing of the content is not scheduled, the viewing schedule information indicates that the recognized user is not scheduled to view the content,
in the control step, deletion of the designated content is inhibited, in a case where the viewing schedule information indicates that a user other than the predetermined user is scheduled to view the designated content.

10. A control method of a reproduction apparatus which reproduces a content in a recording medium, the method comprising:
a recognition step of recognizing users;
a management information processing step of generating management information relating to the content including viewing schedule information which indicates whether each of the plurality of users is scheduled to view or not, a setting step of setting whether a user recognized by the recognition step is scheduled to view or not the content in accordance with an instruction from the recognized user;

a receiving step of receiving, from a predetermined user recognized by the recognition step, a deletion instruction for instructing to delete a designated content;

a deletion step of deleting the designated content from the recording medium in accordance with the deletion instruction; and a control step of controlling the deletion step, based on the viewing schedule information relating to the designated content, wherein the management information processing step sets the viewing schedule information in accordance with a set result by the setting step such that if it is set that viewing of the content is scheduled, the viewing schedule information indicates that the recognized user is scheduled to view the content, and if it is set that viewing of the content is not scheduled, the viewing schedule information indicates that the recognized user is not scheduled to view the content, and the control step inhibits deletion of the designated content by the deletion step, in a case where the viewing schedule information indicates that a user other than the predetermined user is scheduled to view the designated content.

11. A non-transitory computer-readable storage medium storing a program for causing a computer to execute the control method according to claim 9.

12. A non-transitory computer-readable storage medium storing a program for causing a computer to execute the control method according to claim 10.

* * * * *